United States Patent [19]
Christopher

[11] Patent Number: 5,217,226
[45] Date of Patent: Jun. 8, 1993

[54] THREE-DIMENSIONAL MODEL ATMOSPHERE PUZZLE

[76] Inventor: Anthony F. Christopher, 20 Pleasant St., Wakefield, Mass. 01880

[21] Appl. No.: 825,936

[22] Filed: Jan. 27, 1992

[51] Int. Cl.⁵ ............................ A63F 9/12; G09B 27/08
[52] U.S. Cl. .................... 273/157 R; 434/146; 434/153; 273/157 A
[58] Field of Search .......... 273/156, 157 R, DIG. 14; 434/130–132, 135, 146, 152, 153; 362/809

[56] References Cited

U.S. PATENT DOCUMENTS

| | | | |
|---|---|---|---|
| 2,185,689 | 1/1940 | Jensen | 434/152 |
| 2,491,386 | 12/1949 | Miller et al. | 434/131 |
| 2,987,318 | 6/1961 | Hammer | 434/131 |
| 3,037,300 | 6/1962 | Grosser | 434/147 |
| 3,055,124 | 9/1962 | Gilmer, Jr. et al. | 434/132 |
| 3,768,181 | 10/1973 | Kiener | 434/152 |
| 4,494,935 | 1/1985 | Miller | 434/132 |

*Primary Examiner*—V. Millin
*Assistant Examiner*—Steven Wong

[57] ABSTRACT

A plurality of three-dimensional puzzle pieces will create model atmospheres for model globes and flat puzzles, having a thickness suitable to comprise of all types of subject matter to be embedded within the pieces displaying the subject matter in three-dimensional forms. The subject matter will include the geography of a world, all elements of an atmosphere such as cloud formations and storm systems, and make possible to represent events that were and are being effected by nature and man, such as objects in flight, volcanic eruptions, nuclear explosions, and events of historical importance. Descriptive indicia may appear at any level of the atmosphere adding many areas whereon a great many more listings of significant information can be included, compared to standard globes and maps that have one surface of indicia where crowded confusion can exist when heavily referenced. This model atmosphere, in combination with a globe and support structure, and in puzzle form, will create a superior comprehensive encyclopedia reference globe, and with provisions for replacement pieces, from time to time, to include any significant new worldly developments, models of this globe may be kept current and be valuable educational instruments for many years.

1 Claim, 3 Drawing Sheets

THREE-DIMENSIONAL MODEL ATMOSPHERE PUZZLE

BACKGROUND OF THE INVENTION

This application is related to application Ser. No. 07/757,700 Filed Sep. 11, 1991.

This invention relates to three-dimensional puzzle pieces, and to globe puzzles.

PRIOR ART

Puzzles of all types have been available for many years, and globes have been used as models of the earth for centuries. Many attempts have been made to combine the puzzle and globe. Some of these are listed below.

U.S. Pat. Nos. 3,016,629 1/1962, Case. 3,037,300 6/1962, Grosser. 4,494,935 1/1985, Miller.

The Case patent advocates the use of transparent puzzle segments, as does the Grosser patent. The Miller patent suggests three-dimensional topography, but does not suggest transparency. Neither these, nor any other in the field of this invention, suggests their models include an atmosphere. The lack of this feature in their inventions is the basis of my invention, and this will become apparent as the descriptions continue.

OBJECTS AND ADVANTAGES

An object of my invention is to provide three-dimensional model atmosphere puzzle pieces for all types of puzzles, especially jigsaw type puzzles. The pieces will have a suitable thickness that will allow for all types of subject matter to be embedded within, including subject matter never before attempted in the field of the invention. Among these are all elements of an atmosphere, such as cloud formations, and other objects that utilize the atmosphere, as do objects in flight. All subject matter will appear in three-dimensional forms, when applicable.

Descriptive indicia will be applied in an innovative way, adding substantially to the amounts of information that can be included, and eliminates the crowded confusion that can exist on current maps and globes that have only one surface of information. My invention creates model atmospheres for model globes, as well as flat puzzles, and makes possible a more comprehensive reference system than any other, and contributes to an improved method of creating an authentic replica of the earth.

As an earth model, and viewed from a distance, a person sees this model as the earth seen from space. The swirling clouds and splashes of color is one of the most magnificent sights and brilliant displays of natural beauty ever seen by human beings. When approached, the person sees that this model also is a reference globe, and a puzzle.

My invention contributes to a model globe that in any of its presentations; a puzzle, a comprehensive reference guide and supplier of world history and geography, bringing the challenge and enjoyment of the puzzle, substantial educational benefit, culminating in a replica of one of the most beautiful objects ever seen, and to display this model as an instrument of enjoyment and education, and for its inspiring natural beauty, makes my invention far superior to all others in the field of this invention.

REFERENCE TO THE DRAWINGS

Figure 1:
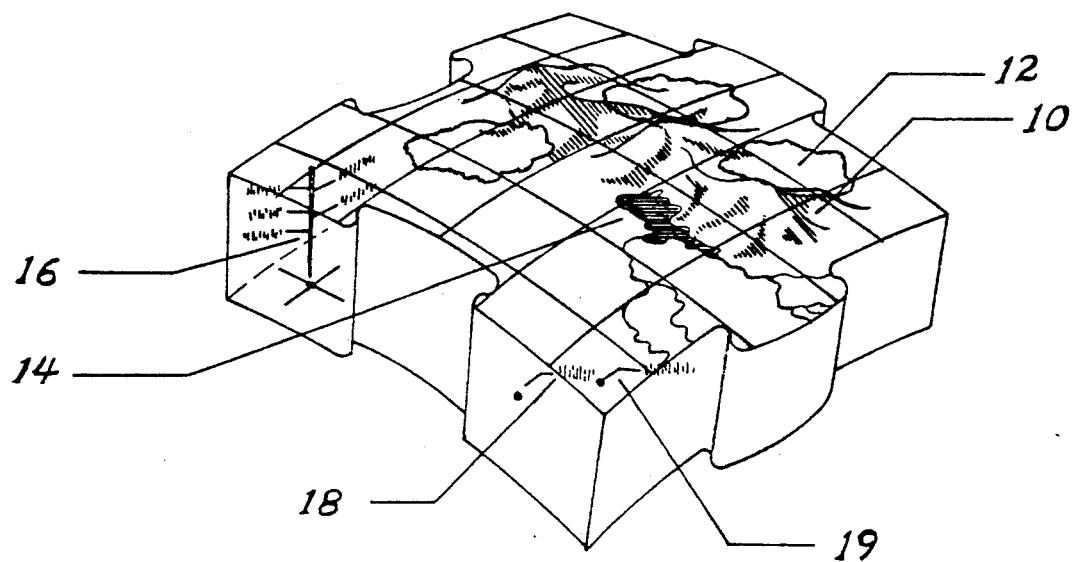
FIG. 1 shows a perspective view of the three-dimensional puzzle piece in its convexed form.

Reference Numerals 10 mountain range
12 cloud formation
14 body of water with rivers
16 central reference lead lines
18 indicates descriptive indicia
19 singular reference lead lines
20 tilt adjustment feature

DESCRIPTION OF THE INVENTION

FIG. 1 shows a perspective view of the three-dimensional puzzle piece of this invention and shows that it is convexed, and be used on a globe base. It may also be made flat for conventional flat type puzzles. A plurality of these pieces will be manufactured of transparent plastic material, and have a thickness suitable for the inclusion of all types of subject matter to be embedded within and throughout the confines of the whole puzzle. Subject matter will include, as shown in FIG. 1, mountain ranges 10, cloud formations 12 in the area, and a body of water 14 with rivers. FIG. 1 is a sample indicating one of the many possibilities of how subject matter may be presented, and represents the intention of my invention to create model atmospheres for all types of puzzles. Also in FIG. 1, it shows a method of indicating subject matter by descriptive indicia 18 appearing at any of the levels made possible by the atmosphere. This method allows for considerably more information to be listed than do other types of reference globes and maps that have only one surface for information. Also in FIG. 1, a method of connecting descriptive indicia 18 to relative points of interest will be by lead lines that can assume any position, angle, or curve, and be of any length. The lead lines will include central reference lead lines 16, that will be used to connect points of interest, such as a city, that has had many occurrences of historical significance, or contains much geographical information. The central lead line 16, in this case, will descend vertically through the model atmosphere to connect the city with the many single references that will be made to the central lead line 16. This system eliminates the crowded confusion of heavily referenced maps and globes that have only one surface, and minimizes descriptions being placed on a globe surface leaves the topography free to display its features. Also in FIG. 1, singular reference lead lines 19 will connect areas that are less crowded with information.

DESCRIPTION OF THE INVENTION

Figure 2:
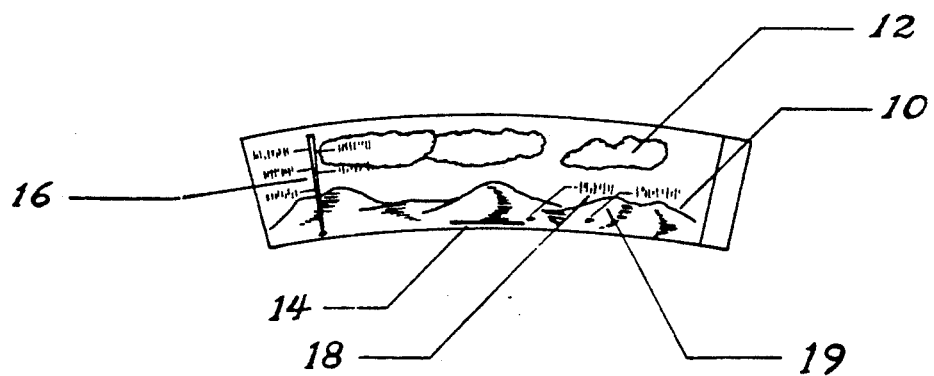
FIG. 2 is a side view of the puzzle piece.

FIG. 2 is a side view of the convexed puzzle piece and shows the elevation of the model atmosphere. In FIG. 2, mountains 10, clouds 12, and a central lead line 16 are shown. The central lead line 16 is shown being referenced by many single lead lines connecting descriptive indicia 18, and singular lead lines 19 are shown connecting to surface areas, and all show the various levels Of the model atmosphere that may be used in this manner.

Figure 3:
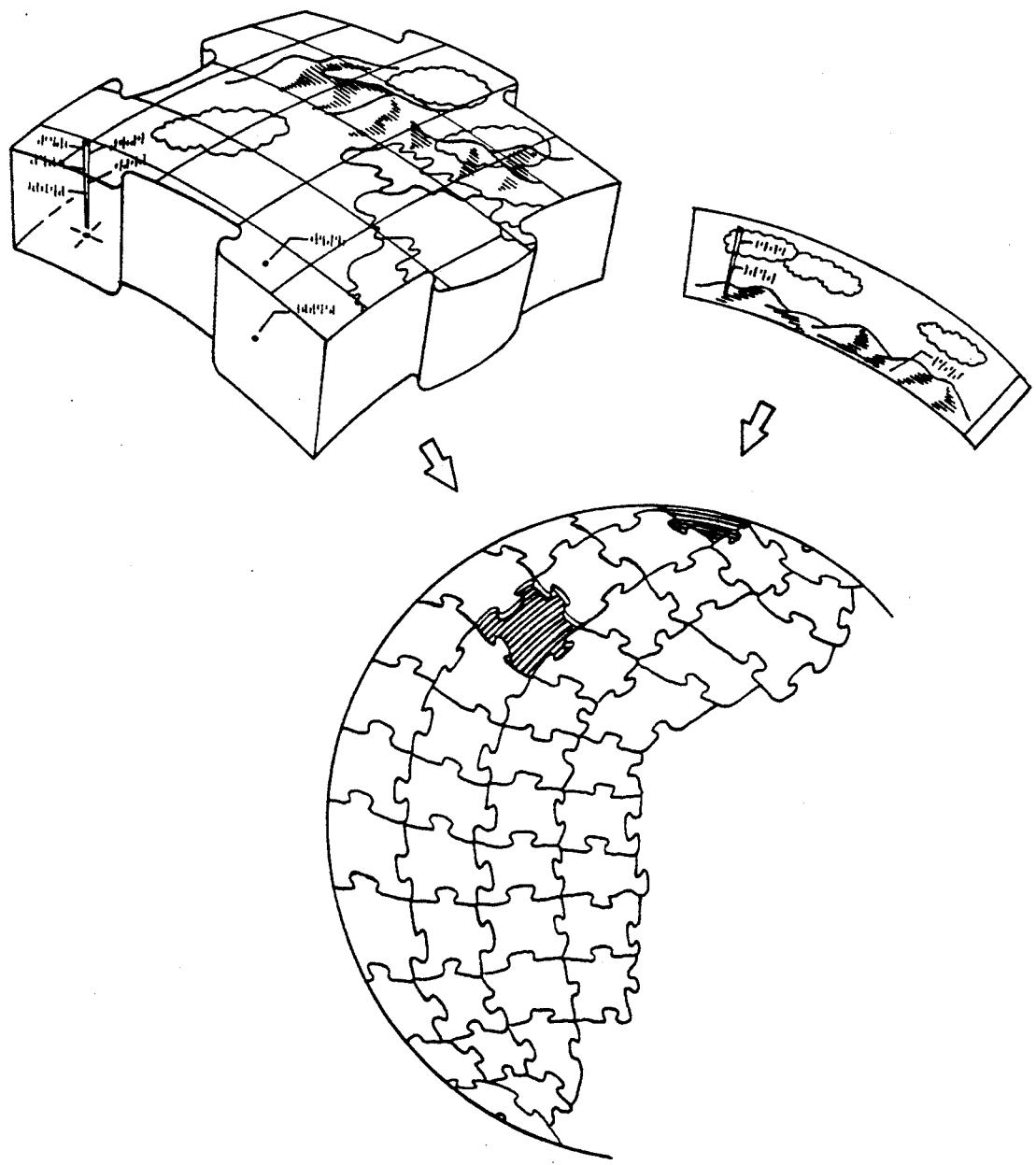
FIG. 3 shows a detail of the invention with FIGS. 1 & 2 indicated to respective positions on a globe base.

FIG. 3 is a detail view showing the puzzle pieces of FIGS. 1 and 2 indicated to their respective positions on a globe base.

Figure 4:
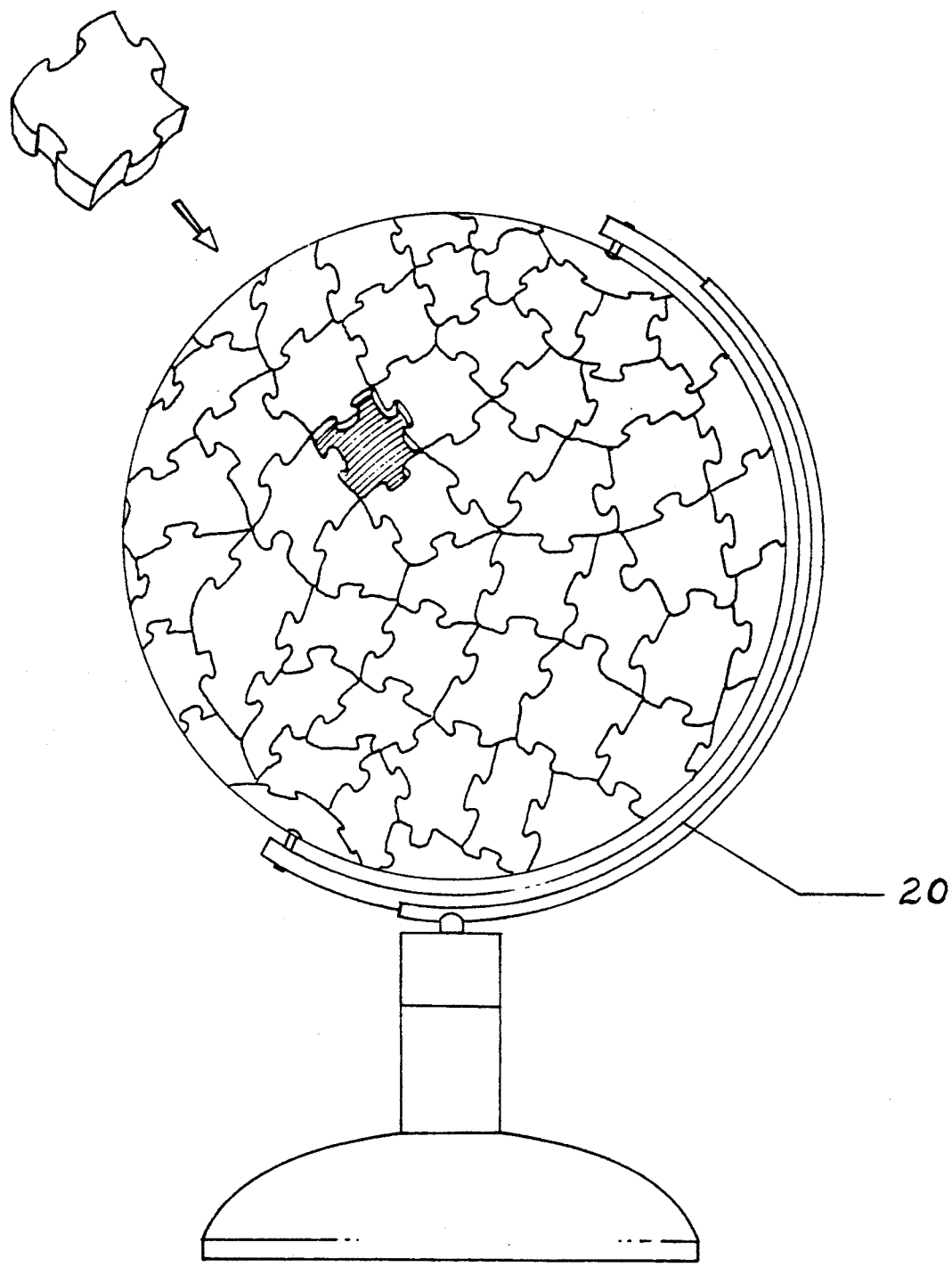
FIG. 4 is a comprehensive view of the puzzle on a globe base.

FIG. 4 is a comprehensive view and shows the relationship of the puzzle piece to the whole puzzle assembled on a globe base having a support system that includes a tilt adjustment feature 20.

SUMMARY-ALTERNATIVES AND RAMIFICATIONS

The puzzle pieces of this invention will use interlocking connections, although this feature will not be needed for some flat puzzles. For the globe puzzle, the interlocking connections will be firm and tight enough to secure the pieces in place as the puzzle wraps around the globe base. This is possible due to the thickness of the pieces, and the intended light weight of the material used in manufacturing. Other than the possible need for a peg or bar on the underside of each piece to correspond with a hole or indentation on the globe base for purposes of alignment, and some added securing assistance, no other method of securing should be needed.

As a reference globe, it is best suited for the information it provides rather than for continuous use as a puzzle, however, it remains a matter of choice as to how a person desires to implement this model. As a comprehensive information model, the puzzle allows for an added embodiment. In the event of new worldly developments of historical significance, these areas of the model will be replaced with pieces containing the new information, whereby these model globes will be kept Current for many years, making it very practical for institutions, such as school systems and libraries, to include these globes among their instruments of learning.

Alternative globes, less comprehensive, with more emphasis on the hands-on aspect of learning by continuous puzzle building, will be made to suit that situation, and to suit various levels of education. Several languages can be used if applicable.

All subject matter, all of a geography that includes mountains, canyons, oceans, waterfalls, cloud formations, storm systems, objects in flight, etc., all global representations, as well as flat puzzles, of subjects known and unknown, real and imagined, of geography, history, life, fun, and fantasy, are suitable alternative presentations of this invention.

The globe base structure for this invention will have north-south tilt adjustment and east-west rotations that will bring all areas of the reference globe puzzle into comfortable working and studying positions. A comprehensive model of this invention can serve as an encyclopedia reference guide containing, as part of its subject matter, volume and page numbers of a standard encyclopedia where detailed information is accessed.

The possibility of some of the embedded features displaying movement or motion lies within the scope of the invention. Also, the models of the invention may incorporate illumination from within the structure in order to enhance the presentations of the embedded features.

I have described my invention, the embodiments, and alternatives, as thoroughly as possible, however, it is not to be construed that the descriptions limit the scope of the invention and otherwise restrict its potential.

I claim:

1. A spherical puzzle structure comprising a plurality of transparent jigsaw puzzle pieces having cooperating edges which interlock to encircle a spherical puzzle base wherein each said puzzle piece contains three dimensional elements, said three dimensional elements being comprised of:
   means for representing atmospheric members, said representing means including cloud formations and storm systems and wherein said representing means is embedded and suspended within the puzzle piece,
   means for indicating particular areas of the three dimensional elements, said indicating means including descriptive printings and symbols and wherein said indicating means is embedded and suspended within the puzzle pieces, and
   means for referencing particular areas of the three dimensional elements, said referencing means including reference lead lines and wherein said referencing means is embedded and suspended within the puzzle piece.

* * * * *